United States Patent [19]
Munger et al.

[11] Patent Number: 5,902,533
[45] Date of Patent: May 11, 1999

[54] METHOD OF COMPRESSION - INJECTION MOLDING

[76] Inventors: Michael Munger, Harrow; Martin Schuurman, Tecumseh, both of Canada

[21] Appl. No.: 08/728,212

[22] Filed: Oct. 10, 1996

[30] Foreign Application Priority Data

Feb. 7, 1996 [CA] Canada ................................. 2169015

[51] Int. Cl.⁶ ............................. B29C 43/28; B29C 45/14
[52] U.S. Cl. ........................... 264/254; 264/266; 264/294
[58] Field of Search ............................ 264/259, 266, 264/255, 294, 328.7, 328.8, 254; 425/112, 130, 125, 128

[56] References Cited

U.S. PATENT DOCUMENTS

| | | |
|---|---|---|
| 4,352,772 | 10/1982 | Bezner ..................................... 264/229 |
| 4,766,025 | 8/1988 | Sanok et al. .............................. 428/159 |
| 5,091,131 | 2/1992 | Schumacher et al. ................... 264/112 |
| 5,209,880 | 5/1993 | Miwa ....................................... 264/266 |
| 5,292,465 | 3/1994 | Kobayashi et al. ................... 264/328.7 |
| 5,352,397 | 10/1994 | Hara et al. ............................... 264/266 |
| 5,354,397 | 10/1994 | Miyake et al. ........................... 264/266 |
| 5,370,518 | 12/1994 | Sasaki et al. ............................ 425/147 |
| 5,429,786 | 7/1995 | Jogan et al. ............................. 264/255 |
| 5,679,301 | 10/1997 | Miklas et al. ............................ 264/259 |

*Primary Examiner*—Angela Ortiz
*Attorney, Agent, or Firm*—Kohn & Associates

[57] ABSTRACT

The present method includes an apparatus and method for forming articles having compression molding means and injection molding means. Simultaneous activation of the injection molding means and compression molding means produces an integral article having a compression molded portion and an injection molded portion.

14 Claims, 3 Drawing Sheets

METHOD OF COMPRESSION - INJECTION MOLDING

FIELD OF THE INVENTION

This invention relates to an apparatus and method for producing a substantially integral finished article having injection molded parts and compression molded parts.

BACKGROUND OF THE INVENTION

Compression and injection molding are commonly used in various fields to form finished articles of many industrial products, for example, automobile interior panelling.

Panelling parts, in particular those having a reinforcing and a bearing function, are frequently produced as compression molded parts from compressed fibre composites known as sheet molding material. The compressed plastics fibre in such materials are inexpensive and relatively lightweight, which is particularly advantageous in automobile construction. Other elements such as mounting brackets are attached to the compression molded parts. Since such load bearing elements are generally of a more complex shape, and must have greater stability than panelling, they are usually made from a different material through an injection molding process.

Typically, each of the components for a finished piece is molded separately according to its appropriate method, either compression or injection molding. Once each component is formed, they are fitted together to form a finished product. The fastening or mounting elements may be attached to the panel by a variety of methods including adhesives, rivets, welds, interlocking connections, or other means well-known in the art. Attachment therefore involves an additional step in the manufacturing process and additional materials such as adhesives or rivets. Therefore, the overall cost of manufacturing of each finished article is increased.

Generally, the connection between the elements of such a composite product is relatively weak and often fails during use of the finished article, separating the individual components. Although attempts have been made to strengthen the connection between each component on a finished article, they have been largely unsuccessful.

Therefore, there is a need to provide for an apparatus and method of constructing articles including different components made of injection and compression molding to form a strong connection between each of the components and to avoid weak joints.

SUMMARY OF THE INVENTION

The present invention overcomes the disadvantages of the prior art and provides an apparatus and method for compression and injection molding of a finished product to provide a strong joint between each of the different components.

The present invention also provides for an apparatus and method for compression and injection molding of a finished product where the injection molded piece is attached to the compression molded piece during the molding stage rather than in a later, additional step.

It is a general object of the present invention to provide an apparatus and method for the substantially simultaneous compression and injection molding to produce a final product which is formed as a substantially integral piece.

According to the present invention then, there is provided apparatus for forming articles including compression molding means for heating moldable plastic sheet material to a first temperature, and molding said plastic sheet material under pressure, injection molding means for heating injection moldable plastic material to a second temperature and molding said injection moldable plastic material; said injection molding means communicating at least partially with said compression molding means, whereby substantially simultaneous activation of said molding means will produce a molded article having a compression molded portion, and an injection molded portion.

BRIEF DESCRIPTION OF THE DRAWINGS

Preferred embodiments of the present invention will now be further described in greater detail and will be better understood when read in conjunction with the accompanying drawings, in which.

DETAILED DESCRIPTION

With reference to the drawings, the present invention is an apparatus and method of substantially simultaneous compression-injection molding to form a substantially integral finished product.

Figure 1:
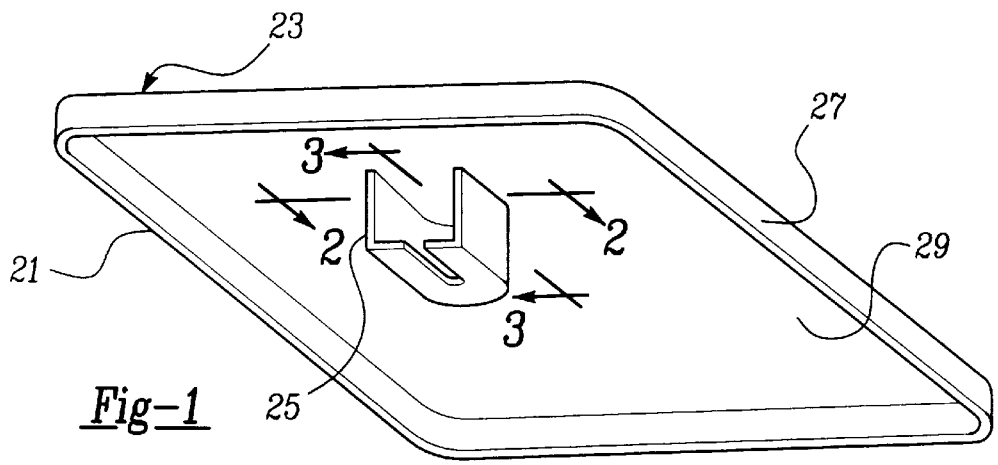
FIG. 1 is a perspective view of a finished compression molded panel with an injection molded bracket, created by the present invention.
Figure 2:
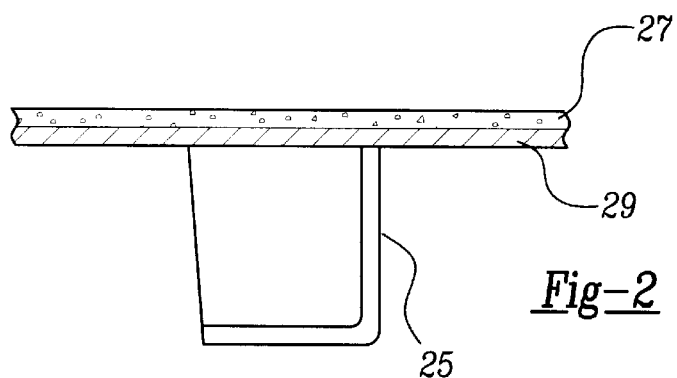
FIG. 2 is a partial lengthwise cross section of the panel and bracket of FIG. 1.
Figure 3:
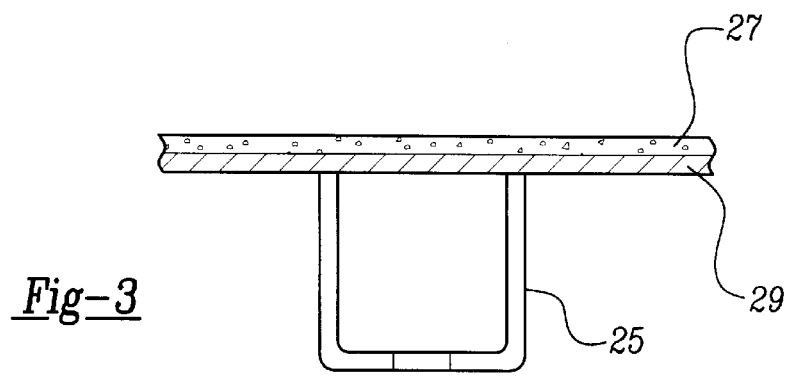
FIG. 3 is a partial widthwise cross section of the panel and bracket of FIG. 1.

Shown in more detail in FIGS. 1, 2 and 3, the finished article 21 is comprised of a relatively flat compression molded panel 23 having a bracket 25 on its reverse surface formed by injection molding. The compression molded panel 23 has a surface layer of cover stock 27 providing an aesthetic covering and a lower layer of sheet molding material 29. The injection molded bracket 25 may be in a generally U-shaped configuration as illustrated. The bracket 25 and panel 23 may, of course, have any shape and size according to the desired finished product through the use of appropriately-shaped molds.

Figure 4:
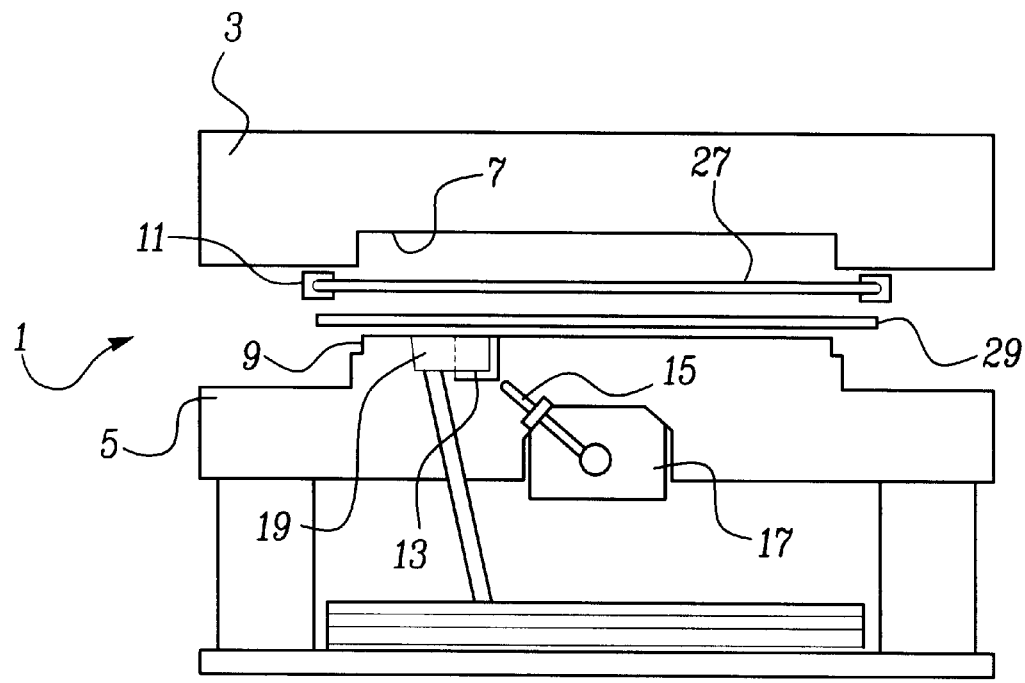
FIG. 4 is a combination compression-injection mold of the present invention in an open position.
Figure 5:
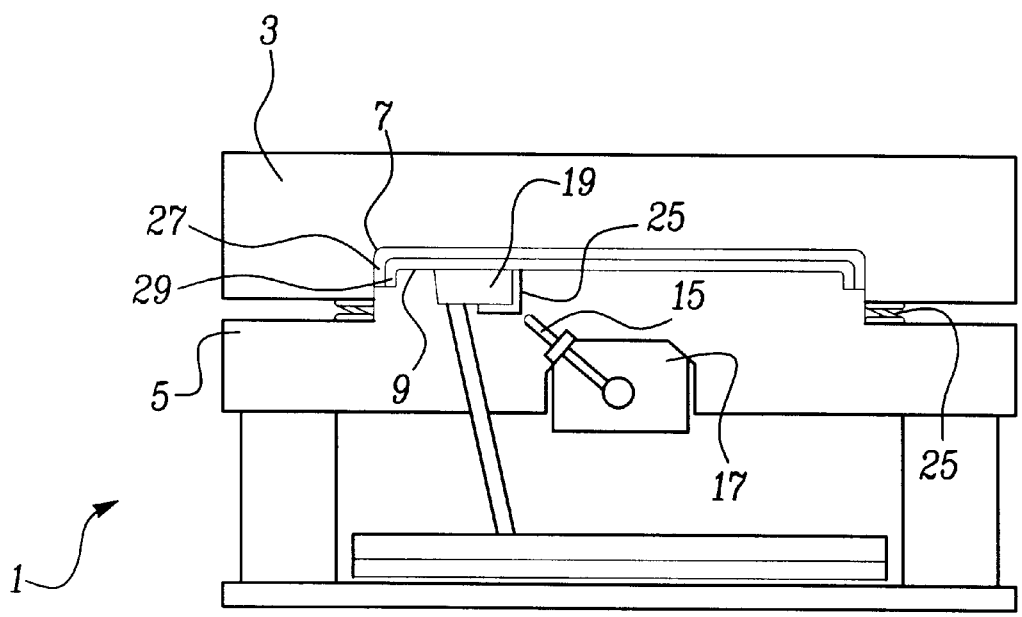
FIG. 5 is the combination compression-injection mold shown in FIG. 4 in a closed position.

Referring in particular to FIGS. 4 and 5, the combination compression-injection mold 1 of the present invention comprises an upper cover mold 3 and lower ejector mold 5. The working surface 7 of the upper cover mold 3 corresponds to the shape of the outside discernible surface of the compression molded piece 23. The working surface 9 of the lower ejector mold 5 corresponds to the shape of the inside or reverse surface of the compression molded piece 23.

Below the cover mold 3 is a frame 11 designed to hold the cover stock 27. The cover stock 27 forms the outside aesthetic covering of the finished article 21. The frame 11 is positioned between the cover 3 and ejector molds 5 but is located beyond the working surfaces 7,9 so that it does not interfere with the molding process.

Within the lower ejector mold 5 are the components used in an injection molding process. Beneath the working surface 9 of the ejector mold 5 is an injection mold 13 corresponding to the desired shape of the bracket 25 of the finished article shown in FIGS. 1 to 3. The injection mold 13 adjoins the working surface 9 of the ejector mold 5 to allow the injection-molded bracket 25 to fuse to the compression molded panel 23 at the desired location. A heated injection nozzle 15 is connected to the injection mold 13. A hot manifold 17 contains and feeds the injection mold material into the nozzle 15 and to the injection mold 13. The hot manifold 17 and the heated nozzle 15 ensure that the injection mold material is heated to substantially the same temperature as the heated sheet molding material 29.

Also within the ejector mold 5 is a lifter 19. It is in contact with the injection mold 13 and may form part of the structure of the injection mold 13. Once a piece is molded, the lifter 19 raises the finished article to allow the panel 23 with the bracket 25 to be removed from the mold.

To construct a finished article 21, cover stock 27 is stretched and held within the frame 11 under the cover mold 3. Heated sheet molding material 29 is deposited on the ejector mold 5. The cover mold 3 is lowered onto the ejector mold 5 and the cover stock 27 contacts the sheet molding material 29. At the point of complete mold closure, the bracket 25 is formed by injection of heated material from the manifold 17 into the bracket mold 13. Because the injection molding material and the heated sheet molding material 29 are at substantially the same temperature, the polymers of each component intermingle and fuse providing a strong connecting bond. As the cover 3 and ejector molds 5 finish compression, excess material is sheared off the molded article and may be removed.

Figure 6:
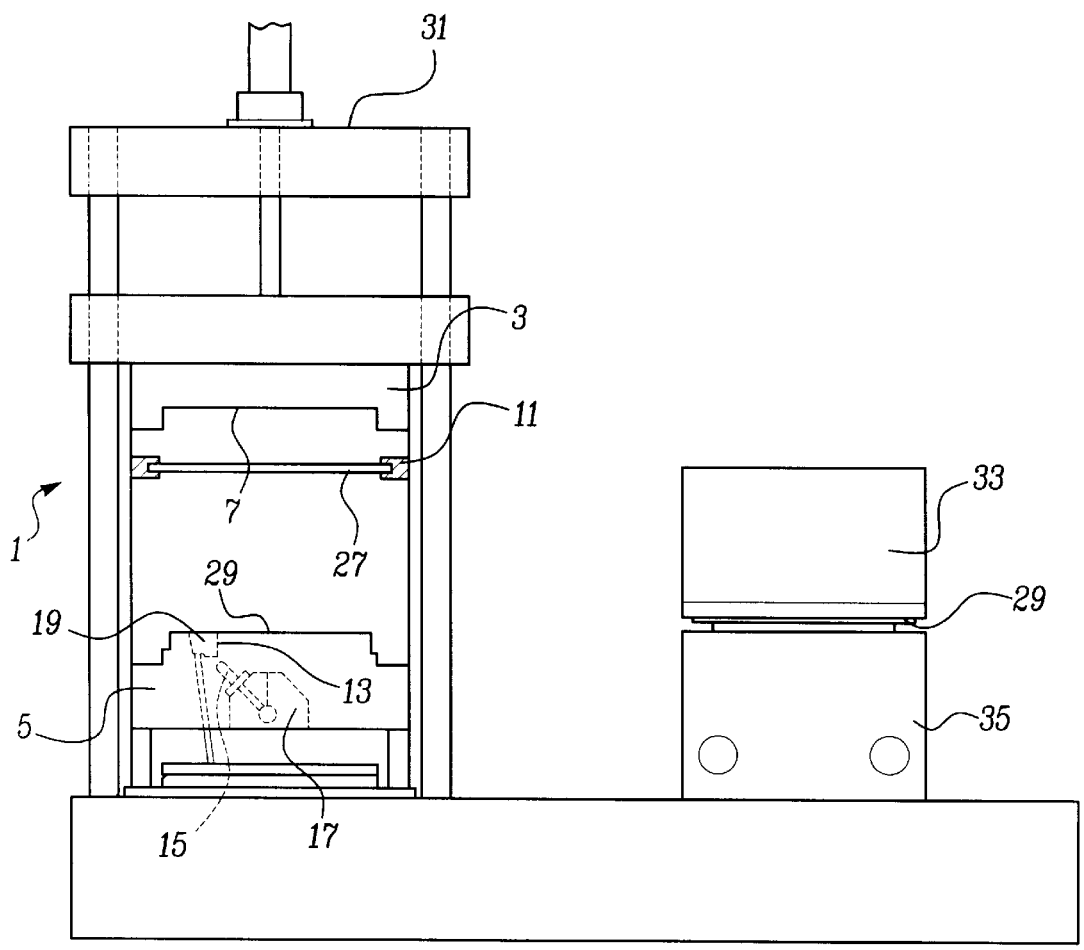
FIG. 6 is a combination compression-injection press in an open position incorporating the mold of FIG. 4.

The combination compression-injection mold 1 is incorporated into a combination compression-injection molding press 31, shown in FIG. 6. The molding press 31 raises and lowers the upper cover mold 3 and the lifter 19 as needed. The press 31 also incorporates an oven 33 and shuttle component 35 for handling and heating the sheet material 29. The sheet molding material 29 is placed on the shuttle 35 and is heated by the oven 33. The oven 33 heats the sheet molding material 29 to the desired temperature approximately equal to the temperature of the injection mold material. The oven 33 is located above and connected to the shuttle 35. The shuttle 35 is portable, moving along a defined area to straddle the ejector mold 5 and deposit the heated sheet mold material 29 on the ejector mold 5 before moving out of the press area. The molding press 31 then lowers the cover mold 3 to begin the molding process described previously.

The above-described embodiments of the present invention are meant to be illustrative of preferred embodiments of the present invention and are not intended to limit the scope of the present invention. Various modifications, which would be readily apparent to one skilled in the art, are intended to be within the scope of the present invention. The only limitations to the scope of the present invention are set out in the following appended claims.

We claim:

1. A method of molding plastic material for forming an article from moldable plastic materials comprising the steps of:
    providing a compression molding apparatus including a cover mold with an inner and outer surface, the inner surface being shaped to mold the outer surface of an article separated by a gap from an ejector mold having an inner and outer surface, the outer surface of said ejector mold being shaped to mold the inner surface of said article;
    providing an injection molding apparatus, said injection molding apparatus including an injection mold, said injection mold being separate from said compression molding apparatus, said injection mold being in fluid communication with said compression molding apparatus, said injection molding apparatus being positioned so that said injection molding apparatus communicates with said ejector mold;
    heating a compression moldable plastic material in contact with said compression molding apparatus;
    heating an injection moldable plastic material in contact with said injection molding apparatus to substantially the same temperature as the compression moldable plastic material; and
    activating said compression and injection molding apparatus to produce a substantially integral molded article having a compression molded portion and an injection molded portion.

2. A method of compression-injection molding according to claim 1 wherein said injection molding apparatus comprises said injection mold; a holding device for the injection moldable plastic material; and an injection nozzle extending from said holding device to said injection mold.

3. A method of compression-injection molding according to claim 2 wherein said holding device for the injection moldable plastic material is heated.

4. A method of compression-injection molding according to claim 3 wherein said injection nozzle is heated.

5. A method of compression-injection molding according to claim 4 further comprising the step of depositing said compression moldable plastic material into said compression molding apparatus.

6. A method of compression-injection molding according to claim 5 further comprising the steps of providing a frame for holding compression moldable cover stock within said compression molding apparatus.

7. A method of forming a substantially integral molded article from moldable plastic materials, said article having a compression molded portion and an injection molded portion, the method comprising:
    providing a compression molding apparatus including a cover mold with an inner and outer surface, the inner surface being shaped to mold the outer surface of an article separated by a gap from an ejector mold having an inner and outer surface, the outer surface of said ejector mold being shaped to mold the inner surface of said article;
    providing an injection molding apparatus, said injection molding apparatus including an injection mold, said injection mold being separate from said compression molding apparatus, said injection mold being in fluid communication with said compression molding apparatus, said injection molding apparatus being positioned so that said injection molding apparatus communicates with said ejector mold;
    heating a compression moldable plastic material in contact with said compression molding apparatus to a compression-molding temperature;
    heating an injection moldable plastic material in contact with said injection molding apparatus to an injection-molding temperature; and
    activating said compression and injection molding apparatus substantially in a simultaneous manner to produce the substantially integral molded article.

8. A method of compression-injection molding according to claim 7 wherein said injection molding apparatus comprises said injection mold; a holding device for the injection moldable plastic material; and an injection nozzle extending from said holding device to said injection mold.

9. A method of compression-injection molding according to claim 8 wherein said injection nozzle is heated.

10. A method of compression-injection molding according to claim 7 wherein said compression-molding temperature is substantially the same temperature as the said injection-molding temperature.

11. A method of forming a substantially integral molded article from moldable plastic material, said article having a compression molded portion and an injection molded portion, the method comprising:

provuding a compression molding apparatus including a cover mold with an inner and outer surface, the inner surface being shaped to mold the outer surface of an article separated by a gap from an ejector mold having an inner and outer surface, the outer surface of said ejector mold being shaped to mold the inner surface of said article;

providing an injection molding apparatus, said injection molding apparatus including an injection mold, said injection mold being separate from said compression molding apparatus, said injection mold being in fluid communication with said compression molding apparatus, said injection molding apparatus being positioned so that said injection molding apparatus communicates with said ejector mold;

activating said compression molding apparatus by heating a portion of said compression molded material to a compression-molding temperature;

activating said injection molding apparatus by heating said injection molded material to an injection molding temperature to form an injection molded portion, said injection molded portion being a contoured article that shares a common surface and is integral with the compression molded portion.

12. A method of compression-injection molding according to claim 11 wherein said injection molding apparatus comprises said injection mold; a holding device for the injection moldable plastic material; and an injection nozzle extending from said holding device to said injection mold.

13. A method of compression-injection molding according to claim 11 wherein said compression-molding temperature is substantially the same temperature as the said injection-molding temperature.

14. A method of compression-injection molding according to claim 11 wherein the activation of said compression-molding apparatus occurs substantially in a simultaneous manner with the activation of said injection molding apparatus to produce the substantially integral molded article.

* * * * *